(12) United States Patent
Bottarel et al.

(10) Patent No.: US 9,450,434 B2
(45) Date of Patent: Sep. 20, 2016

(54) ENERGY HARVESTING SYSTEM WITH SELECTIVELY ACTIVATABLE HARVESTING INTERFACE, AND METHOD OF ENERGY HARVESTING

(71) Applicant: STMicroelectronics S.r.l., Agrate Brianza (IT)

(72) Inventors: Valeria Bottarel, Novara (IT); Giulio Ricotti, Broni (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 176 days.

(21) Appl. No.: 14/181,270

(22) Filed: Feb. 14, 2014

(65) Prior Publication Data
US 2014/0239917 A1    Aug. 28, 2014

(30) Foreign Application Priority Data

Feb. 22, 2013   (IT) .............................. TO2013A0149

(51) Int. Cl.
| | |
|---|---|
| H02J 7/00 | (2006.01) |
| H01M 10/44 | (2006.01) |
| H01M 10/46 | (2006.01) |
| H02J 7/32 | (2006.01) |
| H02M 1/36 | (2007.01) |
| H02M 1/00 | (2006.01) |

(52) U.S. Cl.
CPC ............... *H02J 7/0052* (2013.01); *H02J 7/32* (2013.01); *H02M 1/36* (2013.01); *H02M 2001/0032* (2013.01); *Y02B 70/16* (2013.01)

(58) Field of Classification Search
USPC .......................................... 320/101
See application file for complete search history.

(56) References Cited

U.S. PATENT DOCUMENTS

| | | | |
|---|---|---|---|
| 8,729,850 B2 * | 5/2014 | Utsuno ..................... | H02J 7/35 136/252 |
| 2010/0270996 A1 | 10/2010 | Ramadas et al. | |
| 2011/0134665 A1 | 6/2011 | Ivanov | |
| 2011/0241625 A1 | 10/2011 | LoCascio | |
| 2012/0256492 A1 | 10/2012 | Song et al. | |

OTHER PUBLICATIONS

Italian Search Report and Written Opinion for IT TO2013A000149 mailed Oct. 31, 2013 (7 pages).

* cited by examiner

*Primary Examiner* — Eric Lee
(74) *Attorney, Agent, or Firm* — Gardere Wynne Sewell LLP

(57) ABSTRACT

An energy-harvesting system includes a transducer to convert environmental energy into a harvesting electrical signal. A storage element stores electrical energy derived from conversion of the harvested environmental energy. A harvesting interface supplies an electrical charging signal to the storage element. The harvesting interface is selectively connected to the storage element in response to a control signal. The control signal causes the connection when the harvesting electrical signal exceeds a threshold. Conversely, the control signal causes the disconnection when the harvesting electrical signal is less than the threshold.

25 Claims, 6 Drawing Sheets

ENERGY HARVESTING SYSTEM WITH SELECTIVELY ACTIVATABLE HARVESTING INTERFACE, AND METHOD OF ENERGY HARVESTING

PRIORITY CLAIM

This application claims priority from Italian Application for Patent No. TO2013A000149 filed Feb. 22, 2013, the disclosure of which is hereby incorporated by reference.

TECHNICAL FIELD

The present invention relates to an energy-harvesting system with a selectively activatable harvesting interface, and to a method of energy harvesting.

BACKGROUND

As is known, systems for harvesting energy (also known as "energy-harvesting systems" or "energy-scavenging systems") from environmental-energy sources have aroused and continue to arouse considerable interest in a wide range of fields of technology. Typically, energy-harvesting systems are designed to harvest (or scavenge) and store energy generated by mechanical sources, and to transfer it to a generic load of an electrical type. In this way, the electrical load does not require batteries or other power-supply systems, which are frequently cumbersome, have a low resistance to mechanical stresses, and entail costs of maintenance for interventions of replacement.

The environmental energy may be harvested from different available sources and converted into electrical energy by purposely provided transducers. For example, available energy sources may be mechanical or acoustic vibrations or, more in general, forces or pressures, chemical energy, electromagnetic fields, environmental light, thermal energy. For harvesting and conversion there may be used, for example, electrochemical, electromechanical, piezoelectric, electroacoustic, electromagnetic, photoelectric, electrostatic, thermoelectric, thermoacoustic, thermomagnetic, thermoionic transducers, etc.

Between the transducers and the storage element a harvesting interface (or "harvesting front-end") is normally used, which has the task of receiving the electrical signals supplied by the transducers and supplying a recharging current to the storage element. Harvesting interfaces are designed to present a very high efficiency. In order to function, in fact, the harvesting interfaces must absorb from the storage element an amount of energy, which obviously is no longer available for supplying the load.

A problem constantly present in energy harvesting depends upon the fact that the available sources are usually discontinuous and hence the flow of energy to the storage element may be interrupted. For example, in the case where the energy source is represented by mechanical vibrations or environmental light, a condition of rest or of darkening, respectively, may temporarily substantially annul harvesting and storage of energy from the environment. The harvesting interface continues, however, to receive power-supply energy from the storage element, which tends to run down. However well designed the harvesting interface may be, the consumption in the absence of environmental energy available reduces the overall efficiency of the energy-harvesting system.

It would hence be desirable to reduce the consumption of the harvesting interface when the transducer is not in a condition to receive energy from the environment. In addition, the energy-harvesting system must be able to respond to the activity of the transducer to prevent part of the energy received by the transducer itself from being dispersed.

SUMMARY

An energy-harvesting system and a method of harvesting energy are provided that will enable the limitations described above to be overcome and, in particular, will enable substantial elimination of the absorption of energy by the harvesting interface in the absence of activity of the transducer.

In an embodiment, an energy harvesting system comprises: a transducer configured to harvest environmental energy and convert harvested environmental energy into a harvesting electrical signal; a storage element configured to store electric energy derived from conversion of the environmental energy harvested by the transducer; a harvesting interface coupled to the transducer and configured to supply a charge electrical signal to the storage element as a function of the harvesting electrical signal; and a selective connection device configured to connect a supply terminal of the harvesting interface to the storage element when the harvesting electrical signal is in a first relationship with an activation threshold and to disconnect the supply terminal of the harvesting interface from the storage element when the harvesting electrical signal is in a second relationship with the activation threshold.

In an embodiment, a method of energy harvesting comprises: converting environmental energy into a harvesting electrical signal through a transducer; storing electric energy derived from the conversion of the environmental energy harvested by the transducer in a storage element; connecting a supply terminal of the harvesting interface to the storage element when the harvesting electrical signal is in a first relationship with an activation threshold; and disconnecting the supply terminal of the harvesting interface from the storage element when the harvesting electrical signal is in a second relationship with the activation threshold.

In an embodiment, a circuit comprises: a transducer configured to convert harvested environmental energy into a harvesting electrical signal; a sensing circuit configured to sense whether the harvesting electrical signal exceeds a threshold; a storage element configured to store electric energy derived from conversion of the environmental energy harvested by the transducer; a harvesting interface coupled to the transducer and configured to supply a charge electrical signal to the storage element; a switching circuit configured to selectively connect a supply terminal of the harvesting interface to the storage element in response to the sensing circuit.

BRIEF DESCRIPTION OF THE DRAWINGS

For a better understanding of the invention, some embodiments thereof will now be described, purely by way of non-limiting example and with reference to the attached drawings, wherein.

DETAILED DESCRIPTION OF THE DRAWINGS

Figure 1:
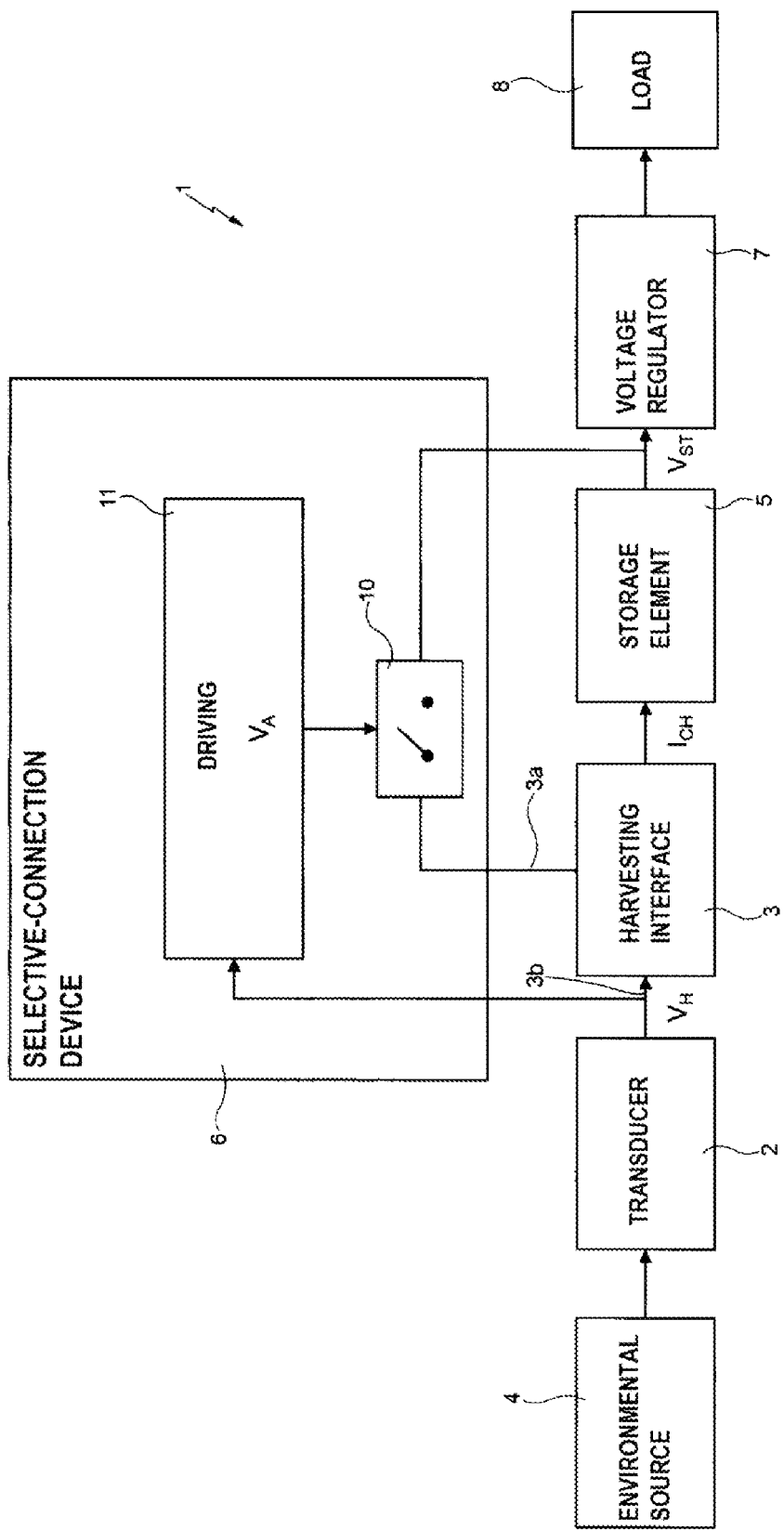
FIG. 1 is a simplified block diagram of an energy-harvesting system according to one embodiment.

With reference to FIG. 1, an energy-harvesting system, designated as a whole by 1, comprises a transducer 2, a harvesting interface 3, a storage element 5, a selective-connection device 6, and a voltage regulator 7. Moreover, an output of the voltage regulator 7 supplies an electrical load 8.

The transducer 2 supplies a harvesting voltage $V_H$ in response to energy supplied by an environmental-energy source 4 external to the harvesting system 1. In one embodiment, the transducer 2 is a piezoelectric transducer that supplies a harvesting voltage $V_H$ in response to mechanical vibrations transmitted by the external environment. It is understood, however, that any other type of transducer could be used, according to the nature of the environmental-energy source available. In particular, there may be used also, but not exclusively, electromagnetic, thermoelectric, piezoelectric, photovoltaic and electrochemical transducers.

When the harvesting interface 3 is supplied by the storage element 5, it receives the harvesting voltage $V_H$ from the transducer 2 and supplies a charging current $I_{CH}$ to the storage element 5. The energy stored in the storage element 5 increases as a result of the charging current $I_{CH}$ and determines a storage voltage $V_{ST}$.

The selective-connection device 6 selectively connects and disconnects a supply input 3a of the harvesting interface 3 and the storage element 5 on the basis of the response of the transducer 2. More precisely, when the harvesting voltage $V_H$ exceeds an activation threshold $V_A$, which is representative of a state in which the transducer 2 is activated and receives environmental energy from outside, the selective-connection device 6 connects the harvesting interface 3 to the storage element 5, so that the harvesting interface 3 receives the storage voltage $V_{ST}$ present on the storage element 5. The harvesting interface may hence use the harvesting voltage $V_H$ for charging the storage element 5. Vice versa, when the transducer 2 does not receive environmental energy and the harvesting voltage $V_H$ is lower than the activation threshold $V_A$, the selective-connection device 6 disconnects the harvesting interface 3 from the storage element 5, so that the consumption of energy by the harvesting interface 3 ceases.

In one embodiment, in particular, the selective-connection device comprises a switch 10 and a driving stage 11, configured to control the switch 10 on the basis of the comparison between the harvesting voltage $V_H$ and the activation threshold $V_A$.

The voltage regulator 7 receives the storage voltage $V_{ST}$ and supplies a regulated supply voltage $V_{DD}$ to the electrical load 8 according to the demand.

The selective supply device 6 makes it substantially possible to annul consumption of the harvesting interface 3 in the absence of activity of the transducer 2 and hence prevents the energy accumulated on the storage element 5 from being dissipated without any effective need when the harvesting system 1 is not in a condition to receive energy from the environment.

Figure 2:
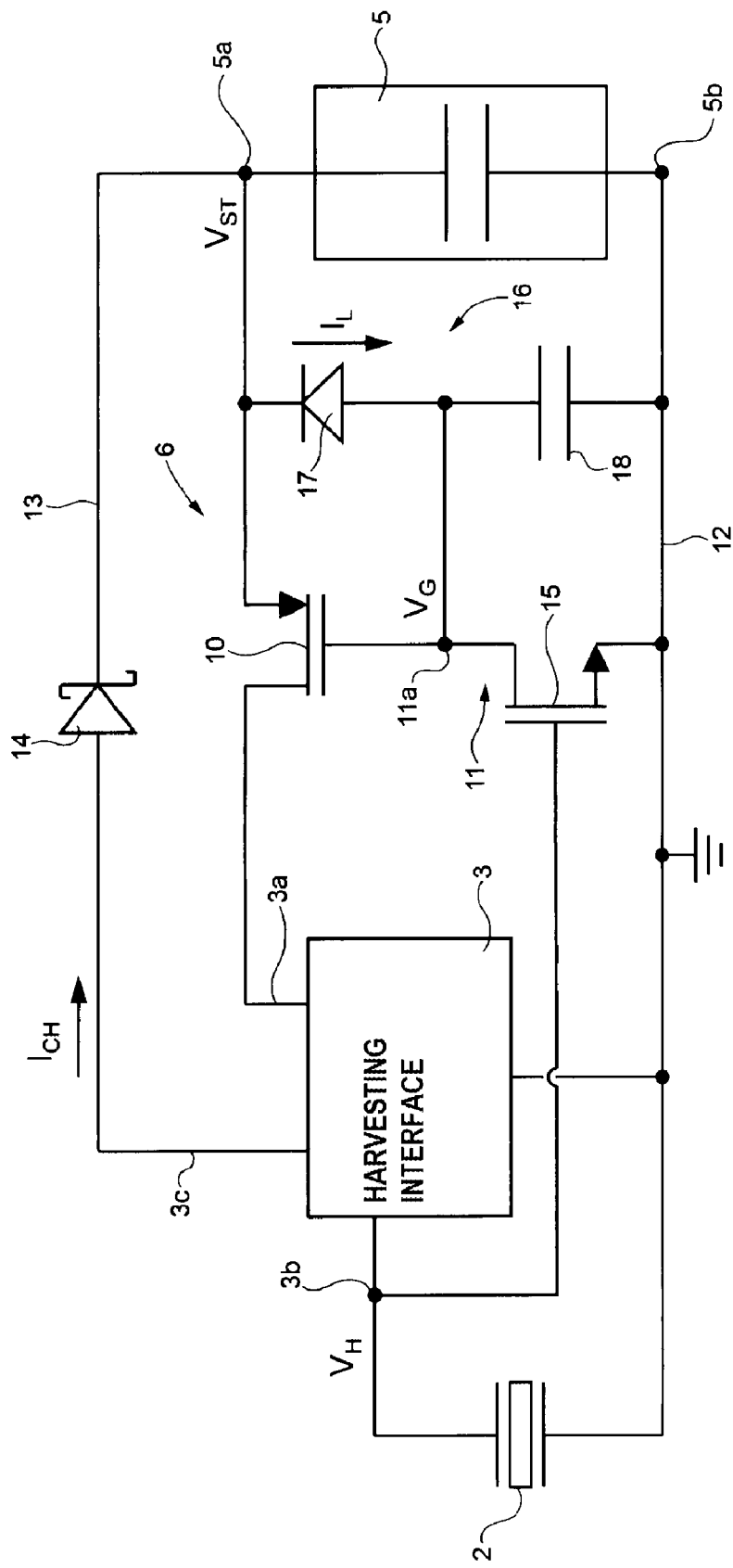
FIG. 2 is a more detailed block diagram of a part of the system of FIG. 1.

FIG. 2 illustrates in greater detail the selective-connection device 6 and shows, moreover, the transducer 2, the harvesting interface 3, and the storage element 5. FIG. 2 also shows a reference line 12, and a charging line 13, along which a Schottky diode 14 is arranged. The transducer 2 is connected between the reference line 12 and an input terminal 3b of the harvesting interface 3. The storage element 5 has a storage terminal 5a, connected to the supply terminal 3a of the harvesting interface 3 and to the charging line 13, and a reference terminal 5b connected to the reference line 12. The charging line 13 is connected between a charging terminal 3c of the harvesting interface 3 and the storage terminal 5a of the storage element 5 and is used by the harvesting interface 3 for supplying the charging current $I_{CH}$ to the storage element 5.

In the embodiment described herein, the switch 10 of the selective-connection device 6 is a PMOS transistor having its source and drain terminals connected, respectively, to the storage terminal 5a of the storage element 5 and to the supply terminal 3a of the harvesting interface 3; the gate terminal is, instead, connected to a driving node 11a of the driving stage 11.

The driving stage 11 is configured to close the switch 10 when the harvesting voltage $V_H$ exceeds the activation threshold $V_A$ and is moreover configured to open the switch 10 using energy taken from the storage element 5 (in a negligible amount) when the harvesting voltage $V_H$ remains below the activation threshold $V_A$ and to stop drawing energy from the storage element 5 after the switch 10 has been opened, disconnecting the harvesting interface 3 from the storage element 5. The residual absorption of current of the driving stage 11 is altogether negligible, of the order of femtoamps, and hence also the energy consumption is substantially interrupted.

In detail, the driving stage 11 comprises an activation transistor 15, which in the embodiment described is an NMOS transistor, and a de-activation network 16.

The gate, source, and drain terminals of the activation transistor 15 are connected, respectively: to the transducer 2 (in particular, to the input terminal 3b of the harvesting interface 3), for receiving the harvesting voltage $V_H$; to the reference line 12; and to the driving node 11a. Moreover, the threshold voltage of the activation transistor 15 defines the activation threshold $V_A$ of the selective-connection device 6.

The de-activation network 16 comprises a diode 17 and a de-activation capacitor 18. The diode 17 has its anode terminal connected to the driving node 11a, and its cathode terminal connected to the storage terminal 5a of the storage element 5 so as to be reverse biased. The de-activation capacitor 18 is connected between the driving node 11a and the reference line 12. The diode 17 hence enables charging of the de-activation capacitor 18 by a reverse leakage current.

Figure 3:
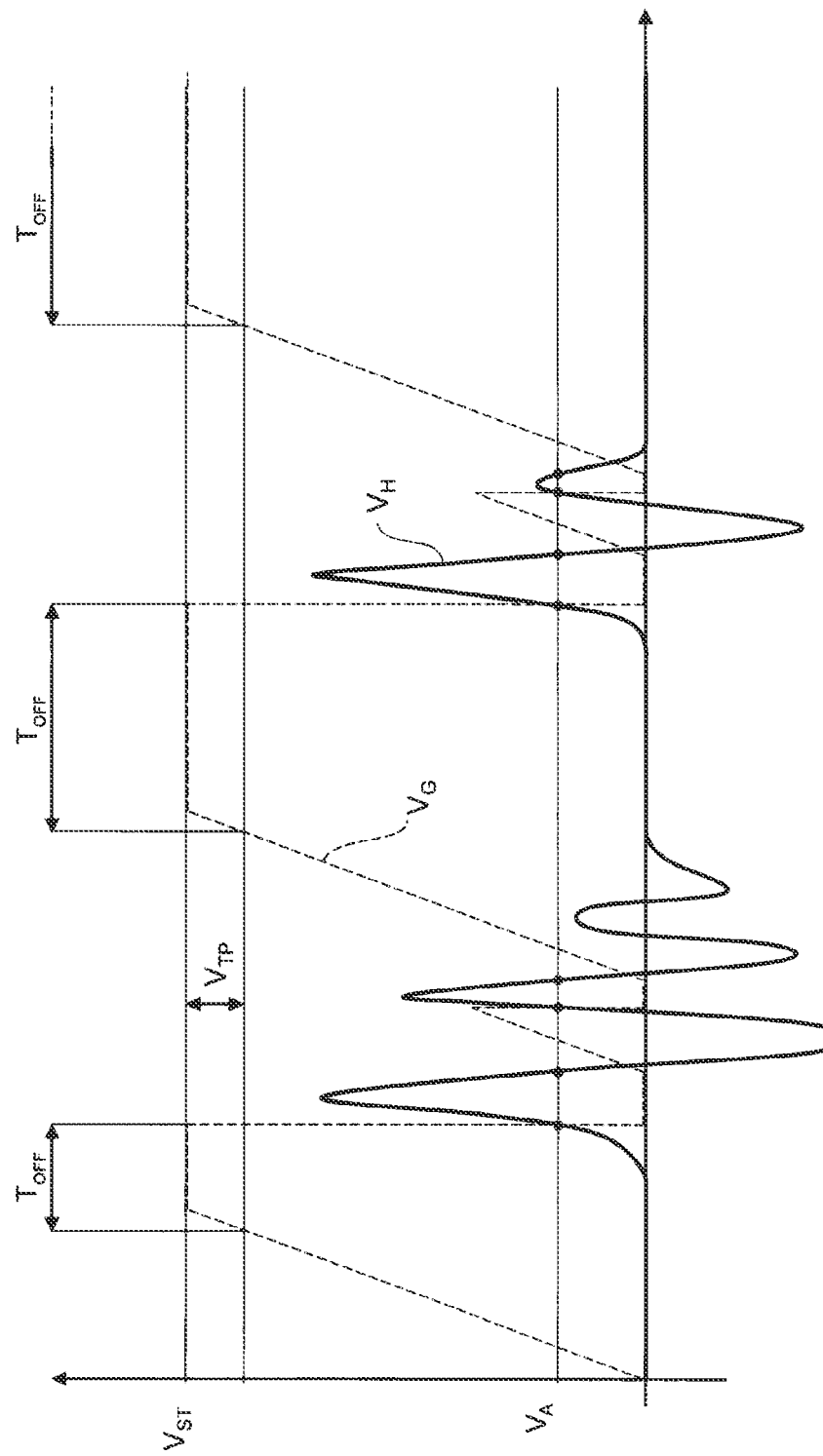
FIG. 3 is a graph that illustrates electrical quantities present in the system of FIG. 1.

The selective-connection device 6 operates as described in what follows, with reference also to FIG. 3.

Assume that, initially, the transducer 2 does not receive energy from the environment. In these conditions, the harvesting voltage $V_H$ is substantially zero and the activation transistor 15 is off. Irrespective of the initial charge state, the de-activation capacitor 18 is charged as a result of the leakage current $I_L$ through the diode 17, which is reverse biased, until a control voltage $V_G$ on the driving node 11a substantially reaches the storage voltage $V_{ST}$. The increase of the control voltage $V_G$ causes the gate-to-source voltage of the switch 10 (which, in the embodiment illustrated, is a PMOS transistor) to drop below a threshold voltage $V_{TP}$, causing the switch 10 to open (start instants of the off intervals $T_{OFF}$). The harvesting interface 3 is thus disconnected from the storage element 5, and consumption ceases. In these conditions, also the de-activation network 16 does not consume. In fact, once the de-activation capacitor 18 has charged to the storage voltage $V_{ST}$, current absorption ceases.

When the transducer 2 receives energy from an external source, the harvesting voltage $V_H$ varies and, as soon as the activation voltage $V_A$ is exceeded, the activation transistor 15 switches on (the activation voltage $V_A$ coincides, in fact, with the threshold voltage of the activation transistor 15). The activation transistor 15 rapidly discharges the de-activation capacitor 18, sending the control voltage $V_G$ substantially to the voltage of the reference line 12. The switch 10 is hence closed, and the harvesting interface 3 is connected to the storage element 5 in a practically immediate way. Moreover, the harvesting interface 3 remains active until the transducer 2 harvests significant levels of energy. In fact, even though the activation transistor 15 may switch off temporarily as a result of the oscillations of the harvesting voltage $V_H$, the switch 10 remains closed until the de-activation capacitor 18 is recharged through the leakage current $I_L$ of the diode 17. On the other hand, this condition may arise only after the transducer 2 has ceased to harvest and transfer of energy from outside because the de-activation capacitor 18 is completely discharged whenever the activation transistor 15 switches on. The harvesting interface 3 is hence able to transfer to the storage element 5 practically all the energy made available by the transducer 2, without any significant losses.

Figure 4:
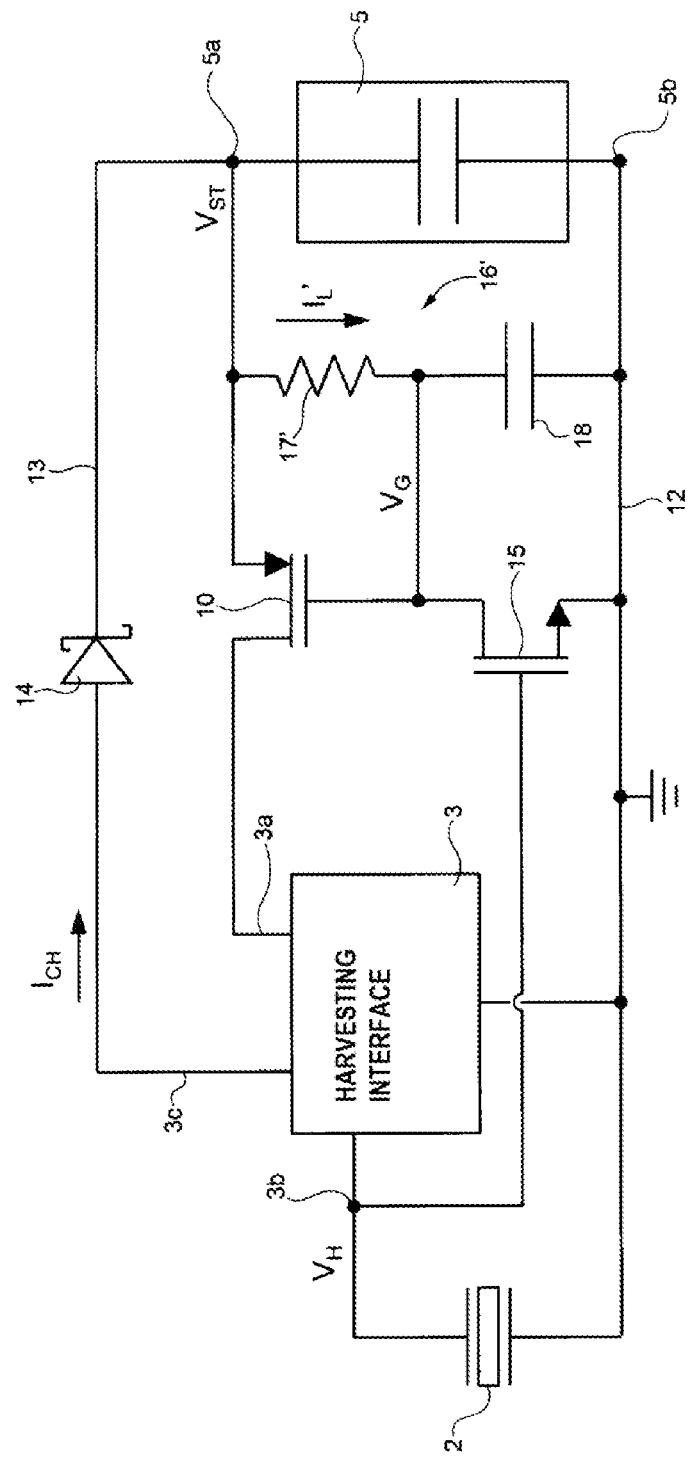
FIG. 4 is a block diagram of an energy-harvesting system according to a different embodiment.

In one embodiment, shown in FIG. 4, in the de-activation network, here designated by 16', the diode 17 is replaced by a resistor 17'. The resistor 17' enables passage of currents higher than the leakage current $I_L$ of the diode 17. Consequently, on the one hand, the de-activation network 16' enables opening of the switch 10 and hence disconnection of the harvesting interface 3 from the storage element 5 in shorter time intervals. On the other hand, the higher current causes a higher consumption when the switch 10 is closed.

In a further embodiment of the invention (illustrated in FIG. 5), an energy-harvesting system 100 comprises the transducer 2, the harvesting interface 3, the storage element 5, and a voltage regulator, which here is not shown. The energy-harvesting system 100 further comprises a selective-connection device 106, configured to selectively connect and disconnect the supply input 3a of the harvesting interface 3 and the storage element 5 on the basis of the response of the transducer 2. The selective-connection device 6 comprises a switch 110 and a driving stage 111.

As in the embodiments described previously, also in this case the switch 110 is a PMOS transistor having its source terminal connected to the storage terminal 5a of the storage element 5 and its drain terminal connected to the supply input 3a of the harvesting interface 3. The gate terminal of the PMOS transistor forming the switch 110 is connected to a first driving node 111a of the driving stage 111.

The driving stage 111 comprises an activation transistor 115, a reference transistor 116, a first auxiliary transistor 117, and a second auxiliary transistor 118. The activation transistor 115 and the reference transistor 116 are NMOS transistors, whereas the first auxiliary transistor 117 and the second auxiliary transistor 118 are PMOS transistors. The activation transistor 115 and the first auxiliary transistor 117 have their respective drain terminals connected in common to the first driving node 111a. The activation transistor 115 has its source terminal and its gate terminal connected, respectively, to the reference line 12 and to the transducer 2 (in particular to the input terminal 3b of the harvesting interface 3), for receiving the harvesting voltage $V_H$. The first auxiliary transistor 117 has its source terminal connected to the storage terminal 5a of the storage element 5 and its gate terminal connected to the second driving node 111b. Moreover, the activation transistor 115 and the first auxiliary transistor 117 are sized so that a leakage current $I_{LA}$ of the activation transistor 115 is lower than a leakage current $I_{LAUX1}$ of the first auxiliary transistor 117, and a saturation current $I_{SA}$ of the activation transistor 115 is higher than a saturation current $I_{SAUX1}$ of the first auxiliary transistor 117.

The reference transistor 116 and the second auxiliary transistor 118 have their respective drain terminals connected in common to the second driving node 111b. The reference transistor 116 moreover has its source and gate terminals both connected to the reference line 12 and hence are always in a cut-off condition. The second auxiliary transistor 118 has its source terminal connected to the storage terminal 5a of the storage element 5 and its gate terminal connected to the first driving node 111a. Moreover, the reference transistor 116 and the second auxiliary transistor 118 are sized so that a leakage current $I_{LR}$ of the reference transistor 116 is higher than a leakage current $I_{LAUX2}$ of the second auxiliary transistor 118.

In the presence of activity of the transducer 2, the harvesting voltage $V_H$ is greater than the activation threshold $V_A$, and hence the activation transistor 115, which is on, maintains the first driving node 111a at a voltage close to the voltage of the reference line 12, as a result of the sizing. The second auxiliary transistor 118 is on and maintains the second driving node 111b substantially at the storage voltage $V_{ST}$. The first auxiliary transistor 117 is consequently off.

When the activity of the transducer 2 is interrupted because energy is not available from the environmental source, the harvesting voltage $V_H$ drops below the activation threshold $V_A$ and switches off the activation transistor 115. Since, owing to the sizing, the leakage current $I_L$ of the activation transistor is less than the leakage current $I_{LAUX1}$ of the first auxiliary transistor 117, the parasitic capacitance $C_P$ between the first driving node 111a and the reference line 12 is charged. The control voltage $V_G$ on the driving node 111a hence increases and tends to switch off the second auxiliary transistor 118 and to open the switch 110. In this step, the leakage current $I_{LR}$ of the reference transistor 116 starts to prevail over the current of the second auxiliary transistor 118, which reduces to the leakage current $I_{LAUX2}$. The voltage on the second driving node 111b drops rapidly and turns on the first auxiliary transistor 117, which in turn causes a sudden rise in the control voltage $V_G$ and definitively opens the switch 110. Consequently, in practice, the reference transistor 116 and the second auxiliary transistor 118 enable initial gradual charging of the parasitic capacitance $C_P$, whereas the first auxiliary transistor 117 intervenes subsequently and rapidly charges the parasitic capacitance $C_P$.

When environmental energy is again available for the activity of the transducer 2, the harvesting voltage $V_H$ exceeds the activation threshold and turns on the activation transistor 115. Since the saturation current $I_{SA}$ of the activation transistor 115 prevails over the saturation current $I_{SAUX1}$ of the first auxiliary transistor 117, the parasitic capacitance $C_P$ on the first driving node 111a is discharged, and the control voltage $V_G$ drops. The second auxiliary transistor 118 turns on, and the switch 110 tends to close. The voltage on the second driving node 111b increases up to switching-off of the first auxiliary transistor 117, enabling the activation transistor 115 to reduce rapidly the control voltage $V_G$ to the voltage of the reference line 12. The switch 110 is thus stably closed.

Consequently, also in this case, the activation device 111 closes the switch 110 in response to the harvesting voltage $V_H$ exceeding the activation threshold $V_A$. Moreover, the activation device 111 uses energy (a leakage current) taken from the storage element for opening the switch 110 when, in the absence of response of the transducer 2, the harvesting voltage $V_H$ remains below the activation threshold $V_A$. Once the switch 110 has been opened, drawing-off of energy ceases (residual absorption of current in the order of femtoamps).

Moreover, the activation transistor 115 must overcome the action of the first auxiliary transistor 117, which is in a condition to supply relatively high currents (in the linear or saturation region) because its gate-to-source voltage is higher than the threshold voltage. This does not cause appreciable delays in the response during the activity of the transducer 2 and, on the other hand, prevents opening of the switch 2 itself from being hindered by subthreshold currents in the activation transistor 115 (due, for example, to noise on the gate terminal).

Figure 6:
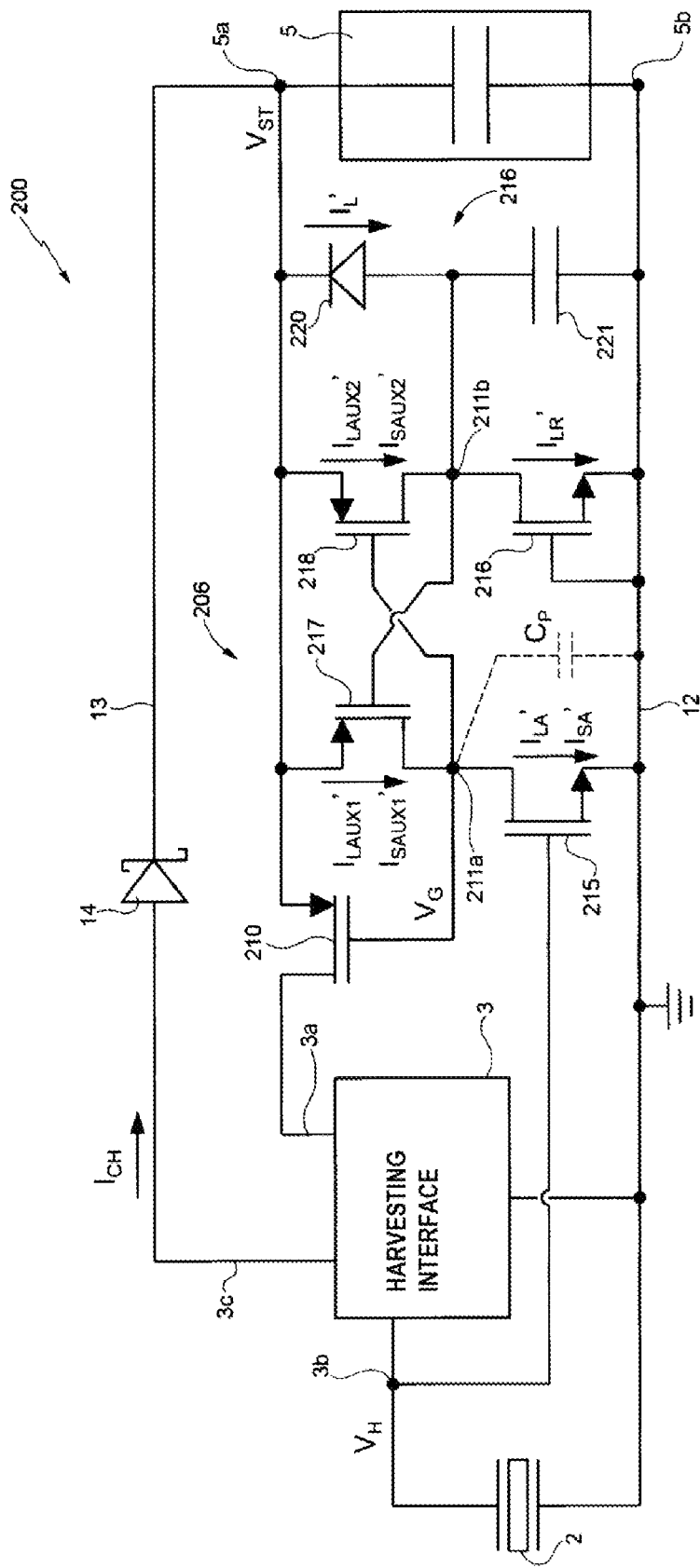
FIG. 6 is a block diagram of an energy-harvesting system according to a further embodiment.

In the embodiment illustrated in FIG. 6, an energy-harvesting system 200 comprises the transducer 2, the harvesting interface 3, the storage element 5, and the voltage regulator 7, which here is not shown. The energy-harvesting system 200 further comprises a selective-connection device 206, configured to selectively connect and disconnect the supply input 3a of the harvesting interface 3 and the storage element 5 on the basis of the response of the transducer 2. The selective-connection device 6 comprises a switch 210 and a driving stage 211.

The switch 210 is a PMOS transistor having its source terminal connected to the storage terminal 5a of the storage element 5 and its drain terminal connected to the supply input of the harvesting interface 3. The gate terminal of the PMOS transistor forming the switch 210 is connected to a first driving node 211a of the driving stage 211.

The driving stage 211 comprises an activation transistor 215, a reference transistor 216, a first auxiliary transistor 217, a second auxiliary transistor 218, and a de-activation network 219, which in turn includes a diode 220 and a de-activation capacitor 221.

Figure 5:
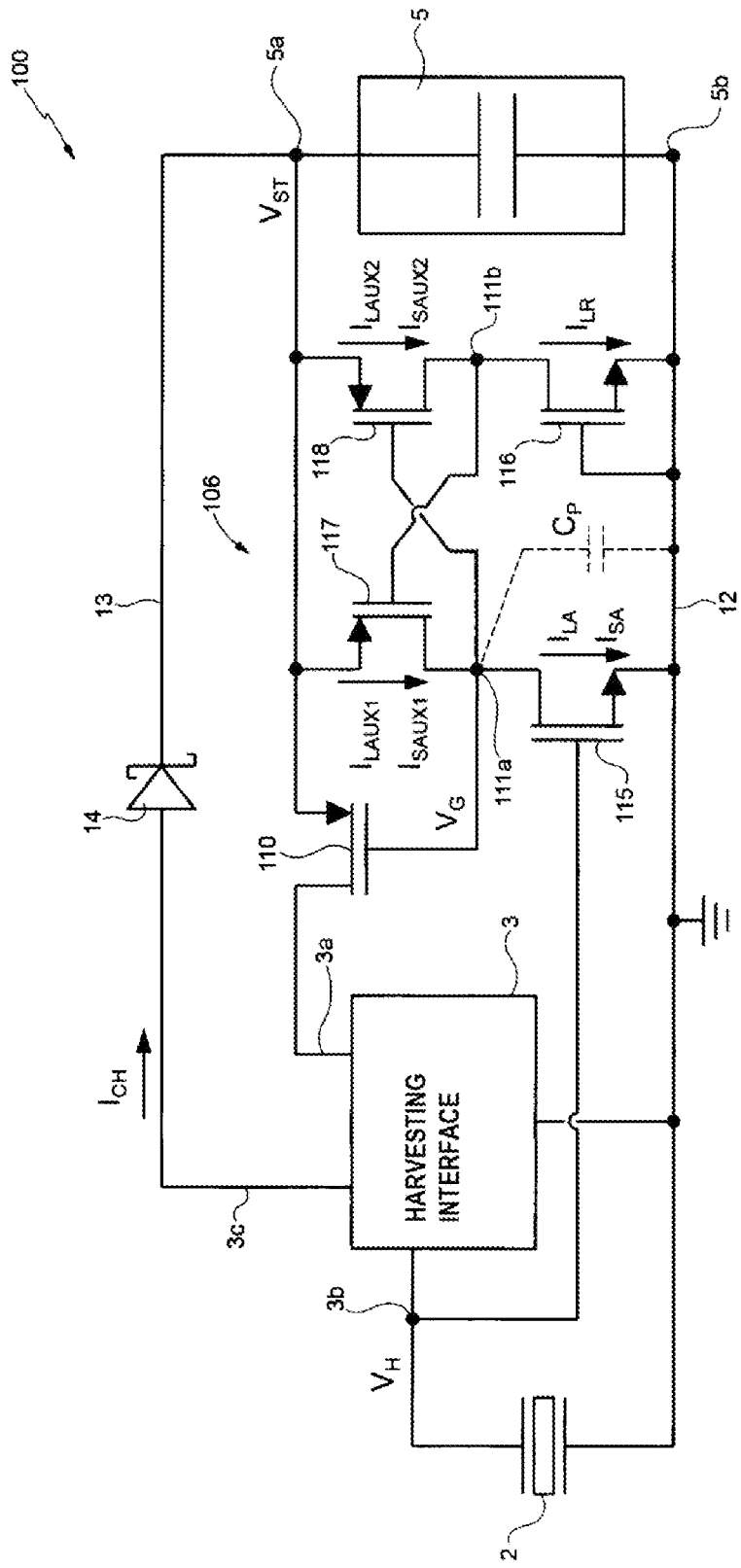
FIG. 5 is a block diagram of an energy-harvesting system according to a further embodiment.

The activation transistor 215, a reference transistor 216, a first auxiliary transistor 217, and a second auxiliary transistor 218 are connected basically as in the activation stage 111 already described with reference to FIG. 5. In detail, the activation transistor 215 and the first auxiliary transistor 217 have their respective drain terminals connected in common to the first driving node 211a. The activation transistor 215 has its source terminal and its gate terminal connected, respectively, to the reference line 12 and to the transducer 2 for receiving the harvesting voltage $V_H$. The first auxiliary transistor 217 has its source terminal connected to the storage terminal 5a of the storage element 5 and its gate terminal connected to a second driving node 211b. The activation transistor 215 and the first auxiliary transistor 217 are sized so that a leakage current $I_{LA}'$ of the activation transistor 215 is lower than a leakage current $I_{LAUX1}'$ of the first auxiliary transistor 217, and a saturation current $I_{SA}'$ of the activation transistor 215 is higher than a saturation current $I_{SAUX1}'$ of the first auxiliary transistor 217.

The reference transistor 216 and the second auxiliary transistor 218 have their respective drain terminals connected in common to the second driving node 211b. The reference transistor 216 moreover has its source and gate terminals both connected to the reference line 12 and hence is always in a cut-off condition. The second auxiliary transistor 218 has its source terminal connected to the storage terminal 5a of the storage element 5 and its gate terminal connected to the first driving node 211a. The reference transistor 216 and the second auxiliary transistor 218 are sized so that a leakage current $I_{LR}'$ of the reference transistor 216 is greater than a leakage current $I_{LAUX2}'$.

In the de-activation network 219, the diode 220 has its anode terminal connected to the second driving node 211b and its cathode terminal connected to the storage terminal 5a of the storage element 5. The de-activation capacitor 221 is connected between the second driving node 211b and the reference line 12.

Finally, it is evident that modifications and variations may be made to the system and to the method described herein, without thereby departing from the scope of the present invention, as defined in the annexed claims.

What is claimed is:

1. An energy harvesting system, comprising:
    a transducer configured to harvest environmental energy and convert harvested environmental energy into a harvesting electrical signal;
    a storage element configured to store electric energy derived from conversion of the environmental energy harvested by the transducer;
    a harvesting interface coupled to the transducer and configured to supply a charge electrical signal to the storage element as a function of the harvesting electrical signal; and
    a selective connection device comprising:
        a switch coupled between the supply terminal of the harvesting interface and the storage element and having a driving node;
        a capacitive element coupled to the driving node;
        a charge circuit coupled to the storage element and driving node and configured to charge the capacitive element; and
        an activation transistor having a control terminal coupled to the transducer so as to receive the harvesting electrical signal and configured to selectively actuate said switch to connect a supply terminal of the harvesting interface to the storage element when a voltage of the harvesting electrical signal exceeds a threshold voltage of the activation transistor and to disconnect the supply terminal of the harvesting interface from the storage element when the voltage of the harvesting electrical signal does not exceed the threshold voltage of the activation transistor.

2. The system according to claim 1, further comprising a circuit configured to open the switch using energy taken from the storage element when voltage of the harvesting electrical signal does not exceed the threshold voltage of the activation transistor for a time interval and to take no energy from the storage element after the switch has opened.

3. The system according to claim 1, wherein a control terminal of the switch is coupled to the driving node.

4. The system according to claim 1, wherein the activation transistor has a first conduction terminal coupled to the driving node and a second conduction terminal coupled to a reference line.

5. The system according to claim 4, wherein the capacitive element is connected between the driving node and the reference line.

6. The system according to claim 1, wherein the driving stage comprises a diode connected between the storage element and the capacitive element so as to be reverse biased.

7. The system according to claim 1, further comprising:
a reference transistor having a source terminal and a gate terminal connected to a first terminal of the storage element and a drain terminal connected to a further driving node;
a first auxiliary transistor having a drain terminal connected to the driving node, a source terminal connected to a second terminal of the storage element and a gate terminal connected to the further driving node; and
a second auxiliary transistor having a drain terminal connected to the further driving node, a source terminal connected to the second terminal of the storage element and a gate terminal connected to the driving node.

8. The system according to claim 7, wherein the activation transistor and the first auxiliary transistor are sized so that a leakage current of the activation transistor is smaller than a leakage current of the first auxiliary transistor and a saturation current of the activation transistor is greater than a saturation current of the first auxiliary transistor.

9. The system according to claim 7, wherein the reference transistor and the second auxiliary transistor are sized so that a leakage current of the reference transistor is greater than a leakage current of the second auxiliary transistor.

10. A circuit, comprising:
a transducer configured to convert harvested environmental energy into a harvesting electrical signal;
a storage element configured to store electric energy derived from conversion of the environmental energy harvested by the transducer;
a harvesting interface coupled to the transducer and configured to supply a charge electrical signal to the storage element;
a switching circuit having a driving node and configured to selectively connect a supply terminal of the harvesting interface to the storage element in response to a control signal;
a capacitive element coupled to the driving node;
a charge circuit coupled to the storage element and driving node and configured to charge the capacitive element; and
a control transistor having a control gate that receives the harvesting electrical signal and a source-drain that generates said control signal in response to the harvesting electrical signal exceeding a threshold voltage of the control transistor.

11. The circuit of claim 10, wherein the switching circuit comprises: a pass transistor having a source-drain path coupled between the supply terminal of the harvesting interface and the storage element.

12. The circuit of claim 10, further comprising a capacitance coupled in parallel with the source-drain path of the control transistor.

13. The circuit of claim 12, further comprising a charging circuit configured to charge the capacitance from the storage element.

14. The circuit of claim 13, wherein the capacitance is a parasitic capacitance of the control transistor.

15. The circuit of claim 13, wherein the capacitance is a capacitor coupled across the source-drain path of the control transistor.

16. An energy harvesting system, comprising:
a transducer configured to harvest environmental energy and convert harvested environmental energy into a harvesting electrical signal;
a storage element configured to store electric energy derived from conversion of the environmental energy harvested by the transducer;
a harvesting interface coupled to the transducer and configured to supply a charge electrical signal to the storage element as a function of the harvesting electrical signal; and
a selective connection device configured to connect a supply terminal of the harvesting interface to the storage element when the harvesting electrical signal is in a first relationship with an activation threshold and to disconnect the supply terminal of the harvesting interface from the storage element when the harvesting electrical signal is in a second relationship with the activation threshold;
wherein the selective connection device comprises:
a switch coupled between the supply terminal of the harvesting interface and the storage element; and
a driving stage configured to close the switch when the harvesting electrical signal is in the first relationship with the activation threshold and to open the switch when the harvesting electrical signal is in the second relationship with the activation threshold; and
wherein the driving stage comprises:
a driving node;
a capacitive element coupled to the driving node;
a charge circuit coupled to the storage element and to the driving node and configured to charge the capacitive element;
an activation transistor having a control terminal coupled to the transducer so as to receive the harvesting electrical signal and configured to determine the discharge of the capacitive element when the harvesting electrical signal is in the first relationship with the activation threshold and to allow charging the capacitive element when the harvesting electrical signal is in the second relationship with the activation threshold.

17. The system according to claim 16, wherein a control terminal of the switch is coupled to the driving node.

18. The system according to claim 16, wherein the activation transistor has a first conduction terminal coupled to the driving node and a second conduction terminal coupled to a reference line.

19. The system according to claim 18, wherein the capacitive element is connected between the driving node and the reference line.

20. The system according to claim 16, wherein the driving stage comprises a diode connected between the storage element and the capacitive element so as to be reverse biased.

21. The system according to claim 16, wherein the driving stage comprises:
a reference transistor having a source terminal and a gate terminal connected to a first terminal of the storage element and a drain terminal connected to a further driving node;
a first auxiliary transistor having a drain terminal connected to the driving node, a source terminal connected to a second terminal of the storage element and a gate terminal connected to the further driving node; and
a second auxiliary transistor having a drain terminal connected to the further driving node, a source terminal connected to the second terminal of the storage element and a gate terminal connected to the driving node.

22. The system according to claim 21, wherein the activation transistor and the first auxiliary transistor are sized so that a leakage current of the activation transistor is smaller than a leakage current of the first auxiliary transistor and a saturation current of the activation transistor is greater than a saturation current of the first auxiliary transistor.

23. The system according to claim 21, wherein the reference transistor and the second auxiliary transistor are sized so that a leakage current of the reference transistor is greater than a leakage current of the second auxiliary transistor.

24. The system according to claim 16, wherein the selective connection device comprises:
- a switch coupled between the supply terminal of the harvesting interface and the storage element; and
- a driving stage configured to close the switch when the harvesting electrical signal is in the first relationship with the activation threshold and to open the switch when the harvesting electrical signal is in the second relationship with the activation threshold.

25. The system according to claim 24, wherein the driving stage is configured to open the switch using energy taken from the storage element when the harvesting electrical signal remains for a time interval in the second relationship with the activation threshold and to take no energy from the storage element after the switch has opened.

* * * * *